United States Patent [19]

Hanemaayer

[11] Patent Number: 5,575,547
[45] Date of Patent: Nov. 19, 1996

[54] VIEWING AND STORAGE SYSTEM FOR A TELEVISON SET OR THE LIKE

[76] Inventor: Jacobus N. Hanemaayer, 100 Shirley Avenue, Kitchener, Ontario, Canada, N2B 2E1

[21] Appl. No.: 494,963

[22] Filed: Jun. 26, 1995

[30] Foreign Application Priority Data

Jun. 29, 1994 [CA] Canada .................................. 2127058

[51] Int. Cl.$^6$ .................................................. A47B 49/00
[52] U.S. Cl. ........................ 312/326; 312/7.2; 312/317.3
[58] Field of Search ................................ 312/7.2, 317.3, 312/326, 203, 350, 282, 281

[56] References Cited

U.S. PATENT DOCUMENTS

| | | |
|---|---|---|
| 1,725,438 | 8/1929 | Brand . |
| 2,656,933 | 10/1953 | Pierie . |
| 3,285,206 | 11/1966 | Hoffman . |
| 3,570,677 | 3/1971 | George . |
| 3,912,324 | 10/1975 | Troyer ..................................... 312/282 |
| 4,046,437 | 9/1977 | Caron et al. .............................. 312/7.2 |
| 4,174,669 | 11/1979 | Lalonde . |
| 4,383,626 | 5/1983 | Weinblatt . |
| 4,437,414 | 3/1984 | Brescia et al. . |
| 4,762,258 | 8/1988 | Murphy . |
| 4,843,977 | 7/1989 | Bridges . |
| 4,871,136 | 10/1989 | Bessinger et al. . |
| 4,909,423 | 3/1990 | Isak . |
| 5,128,344 | 10/1992 | Thurston .................................. 312/7.2 |

FOREIGN PATENT DOCUMENTS

| | | |
|---|---|---|
| 195213 | 12/1919 | Canada . |
| 1037908 | 9/1978 | Canada . |
| 1076524 | 4/1980 | Canada . |
| 1228838 | 11/1987 | Canada . |
| 0607610 | 6/1926 | France ..................................... 312/326 |
| 4197204 | 7/1992 | Japan .................................... 312/317.3 |
| 0152919 | 10/1920 | United Kingdom ................ 312/317.3 |

OTHER PUBLICATIONS 2,036,309—Aug. 14, 1992—published Canadian Application.

*Primary Examiner*—Peter M. Cuomo
*Assistant Examiner*—Gerald A. Anderson
*Attorney, Agent, or Firm*—John W. Ross; Gowlings

[57] ABSTRACT

There is provided a viewing and storage system for a television (TV) set or the like including a cabinet having a pair of adjacent compartments. One said compartment is sized to receive the TV set and has a frontal door opening therein. This one compartment also has a fixed horizontal lower shelf therein and a rotating horizontal support shelf rotatable about a vertical axis. The rotatable shelf is located at a level above said lower shelf and in close juxtaposition thereto. The rotatable shelf is shaped such that when (A) rotated to a first extended position, a substantial portion thereof extends outwardly of said one compartment via said door opening for support of the TV set thereon with the remaining portion of the rotatable shelf overlying said lower shelf. Means are provided for counteracting vertical loadings applied to the outwardly extending portion of said rotatable shelf. The rotatable shelf also is shaped such that when (B) rotated to a second retracted position said rotatable shelf is disposed substantially entirely within said cabinet and extends from said one compartment into the other compartment.

12 Claims, 5 Drawing Sheets

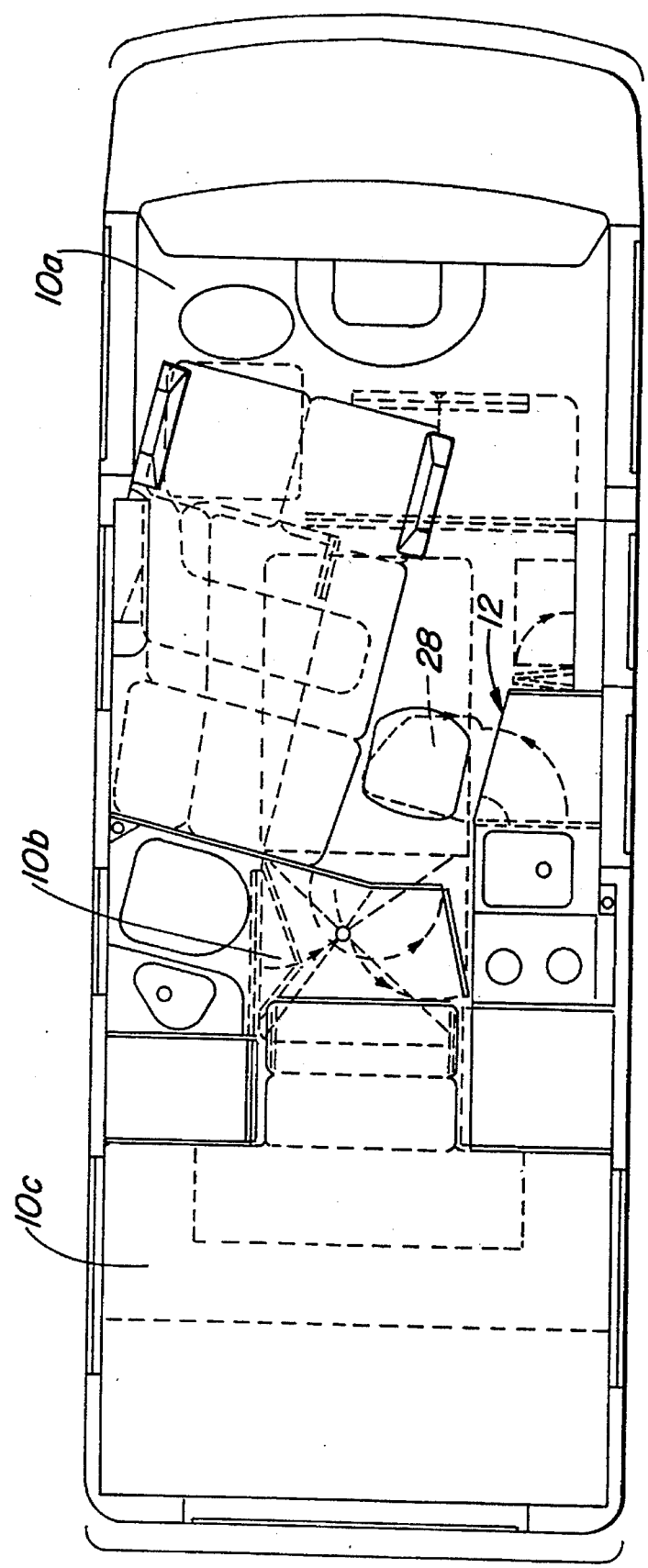
FIG. IA

VIEWING AND STORAGE SYSTEM FOR A TELEVISON SET OR THE LIKE

BACKGROUND OF THE INVENTION

This invention relates generally to a viewing and storage system for a television set or the like which is particularly useful in, although not limited to, a recreational vehicle.

The prior art has provided various types of supports for a television set including various forms of rotating arms with pivoting means on the ends of the arms to allow rotation of the television set relative thereto. In general, these support arm systems lack sufficient rigidity and tend to vibrate, particularly when the recreational vehicle is moving. Provision must be made for these rotating arms together with the television set to be rigidly secured when the vehicle is in motion or, alternatively, the television set must be removed therefrom, both of which alternatives are very inconvenient. In most cases these rotating arms are fastened to an internal wall of the vehicle at their base portions and they tend to be "in the way" thus inhibiting other use of the limited space available within the recreational vehicle both when retracted as well as when in use.

Another alternative is to arrange for the television to be built into a cabinet in a fixed position or, alternatively, positioned loose on an open shelf or counter or secured by either a fixed or pivoting mechanism. In general, these techniques severely limit the choice of viewing angles both fore and aft, particularly in a van and occupy valuable work space or easily accessible shelf space which is needed for other essential purposes and therefor a TV must be removed every time when that space is required for other purposes.

OBJECTS AND SUMMARY OF THE INVENTION

A basic object of the present invention is to provide a viewing and storage system for a TV set or the like which enables the TV set to be seen clearly from virtually all practical viewing angles both front and rear and which enables convenient, safe and secure storage of the TV set when not in use, particularly while driving the recreational vehicle, and which system does not use up to any substantial degree the limited space available in a recreational vehicle which is needed for other preferred uses.

Accordingly, the invention in one aspect provides a viewing and storage system for a television (TV) set or the like including a cabinet having a pair of adjacent compartments. One said compartment is sized to receive the TV set and has a frontal door opening therein. This one compartment also has a fixed horizontal lower shelf therein and a rotating horizontal support shelf rotatable about a vertical axis. The rotatable shelf is located at a level above said lower shelf and in close juxtaposition thereto. The rotatable shelf is shaped such that when (A) rotated to a first extended position, a substantial portion thereof extends outwardly of said one compartment via said door opening for support of the TV set thereon with the remaining portion of the rotatable shelf overlying said lower shelf. Means are provided for counteracting vertical loadings applied to the outwardly extending portion of said rotatable shelf. The rotatable shelf also is shaped such that when (B) rotated to a second retracted position said rotatable shelf is disposed substantially entirely within said cabinet and extends from said one compartment into the other compartment.

According to a further aspect of the invention there is provided a base plate mounted to said portion of the rotatable shelf which is capable of extending outwardly of said one compartment, said base plate being mounted to permit both rotational and translational motion thereof relative to the rotatable shelf whereby to allow a TV mounted thereon to be adjusted to a variety of viewing positions.

A preferred embodiment of the invention further provides stops associated with said rotatable shelf to define both said extended and retracted positions.

In a still further aspect of the invention said pair of compartments are separated by a vertical partition having a slot therein through which part of said rotatable shelf extends in close proximity thereto and the other compartment having a horizontal upper shelf therein with said rotatable shelf being located at a level intermediate said upper and lower shelves and in close juxtaposition thereto to enable said partition and/or said upper and lower shelves to provide said means for counteracting said vertical loadings.

The base plate is preferably provided with a generally L-shaped slot therein for allowing the rotational and translational motion thereof relative to the rotatable shelf.

The vertical pivot axis for the rotatable shelf is preferably located adjacent a frontal or forwardly disposed portion on the vertical partition as well as adjacent a frontal portion of said one compartment. The pivot means in a preferred embodiment comprises a leaf hinge having one leaf secured to the rotatable shelf and another leaf secured to the vertical partition with a suitably cut out portion in the rotatable shelf serving to accommodate the hinge.

In the preferred form of the invention a flexible sliding door (e.g. a so-called Tamhour door), which is slidable in suitable tracks, is provided for closure of the frontal door opening with the sliding door also serving the additional function of retaining the rotatable shelf in the retracted position when the sliding door is closed.

Additional features and advantages of the invention will become apparent from the following description of a preferred embodiment with reference being had to the accompanying drawings.

BRIEF DESCRIPTION OF THE VIEWS OF DRAWINGS

FIG. 1A is a view similar to FIG. 1 but with the television and its support shelf in the extended mode;

DETAILED DESCRIPTION OF THE PREFERRED EMBODIMENT

Figure 1:
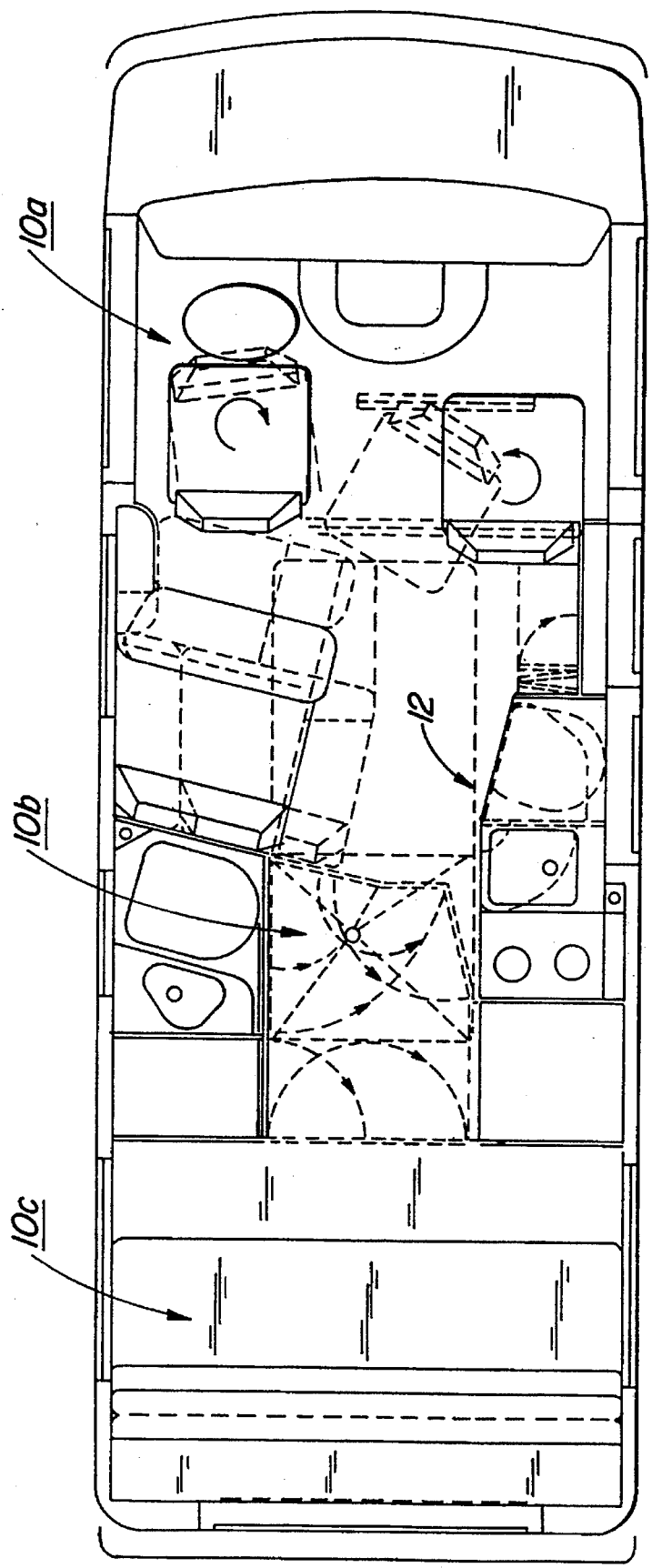
FIG. 1 is a top plan view of the interior of a recreational vehicle with the television (shown in dashed lines) being in its retracted mode under the kitchen cabinet counter.

Referring firstly to FIG. 1 there is shown a recreational vehicle interior including a forwardly disposed seating area 10a, a centrally located utility region 10b incorporating kitchen and toilet facilities (which may be segregated to provide a central privacy area), as well as a rearward region 10c which is typically provided with one or more beds and any desired storage facilities for clothing etc.

The central utility area 10b includes a kitchen cabinet 12 located adjacent a side wall of the vehicle body and facing toward the central aisle or passageway which extends through and allows communication between the frontal seating area 10a and the rearward sleeping area 10c.

In general, the kitchen cabinet 12 includes a horizontal countertop 14, exterior vertical side walls 16 and an interior vertical partition 18 which serves to divide the cabinet interior into a pair of adjacent compartments 20 and 22.

Compartment 20 is of a size such as to receive the TV set therein and this compartment includes a frontal door opening 21 to which reference will be made hereinafter. This compartment 20 also includes a horizontally disposed lower shelf 24 extending between the first side wall 16 and the vertical partition 18 and firmly secured thereto. The other compartment 22 has a horizontally disposed upper shelf 26 therein and extending between vertical partition 18 and the other vertical side wall 16 and firmly secured thereto.

Figure 4:
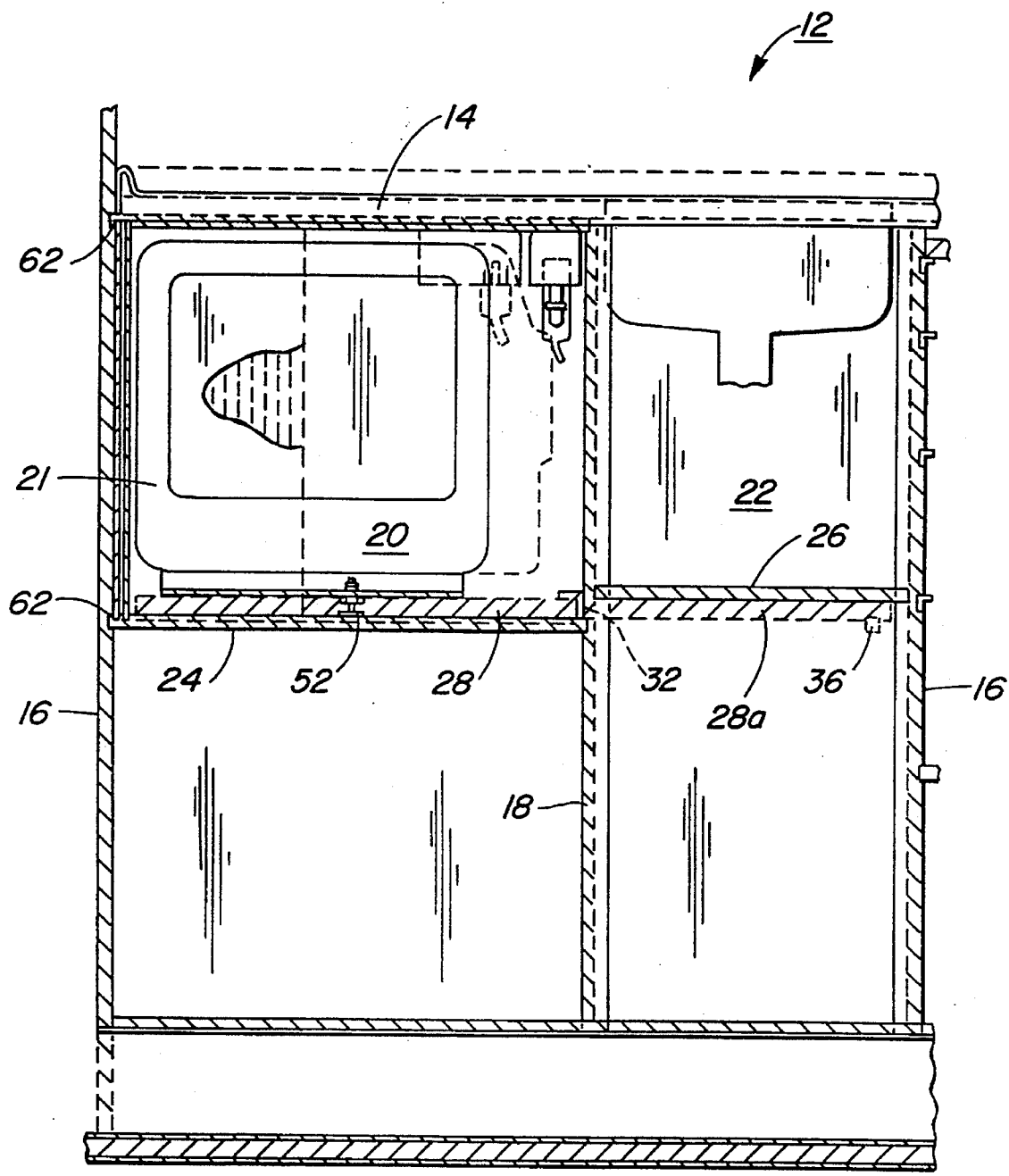
FIG. 4 is a vertical section view taken through the cabinet and looking toward the front showing the rotatable shelf and television in the retracted mode.
Figure 6:
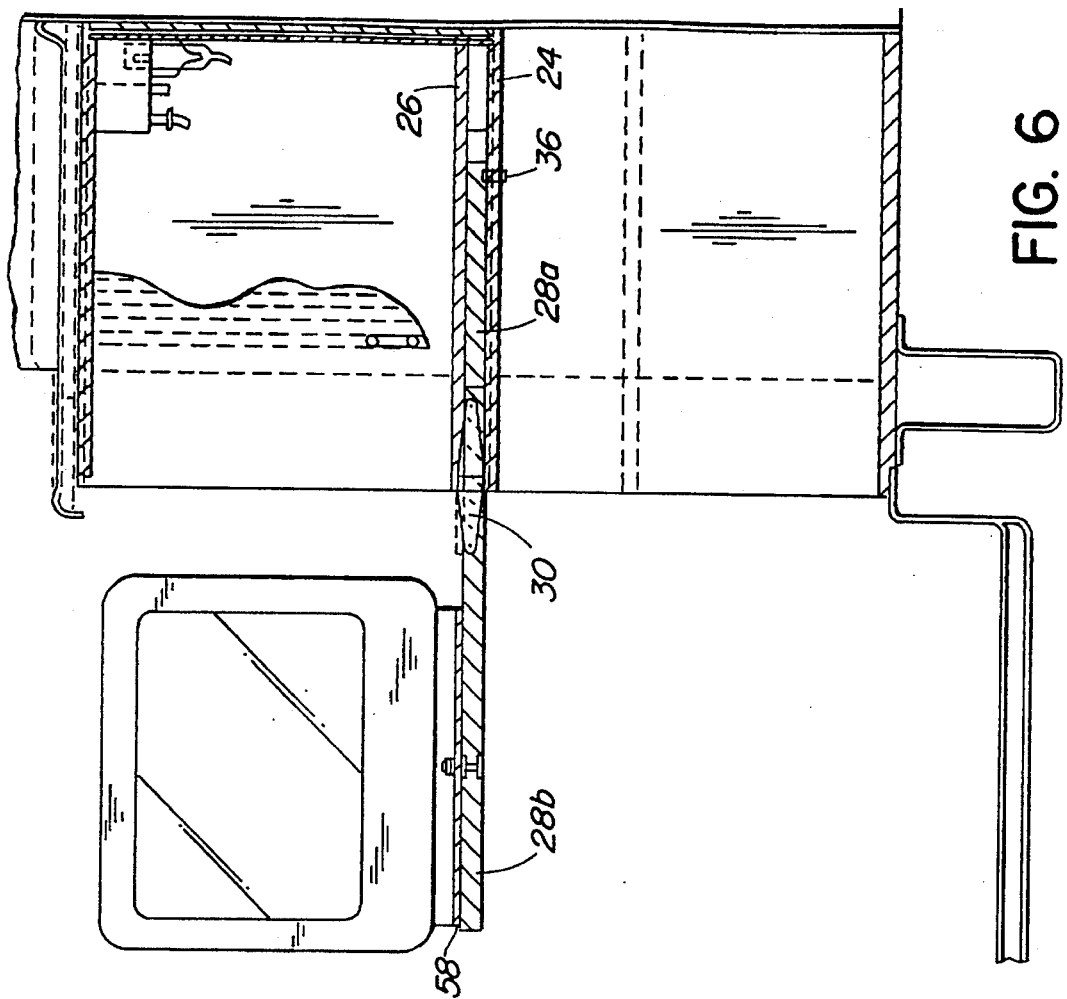
FIGS. 5 and 6 are vertical section views looking at the counter cabinet side-on with the rotatable shelf and television set thereon in the retracted and extended modes respectively.
Figure 5:
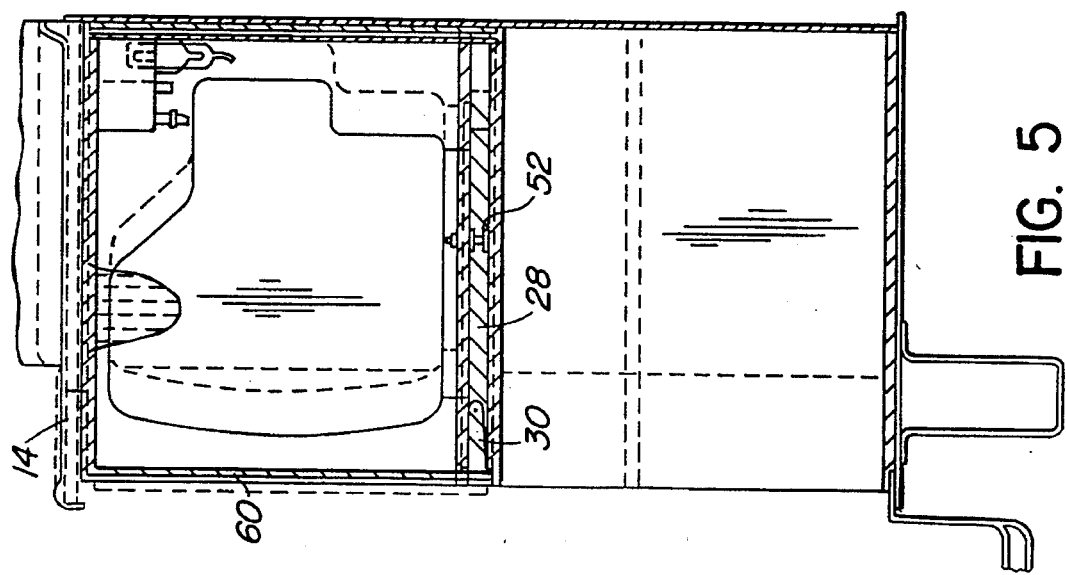

As will be described in further detail hereinafter, the cabinet 12 is provided with a horizontal support shelf 28 rotatable about a vertical axis defined by a leaf hinge 30. As seen for example in FIGS. 2 and 4, a portion 28a of the rotatable shelf 28 extends through a slot 32 which is provided in vertical partition 18.

The rotatable support shelf 28 is in fact located in cabinet 12 at a level intermediate the levels of the upper shelf 26 in compartment 22 and the lower shelf 24 in compartment 20 and it is in close juxtaposition to both of them.

Figure 2:
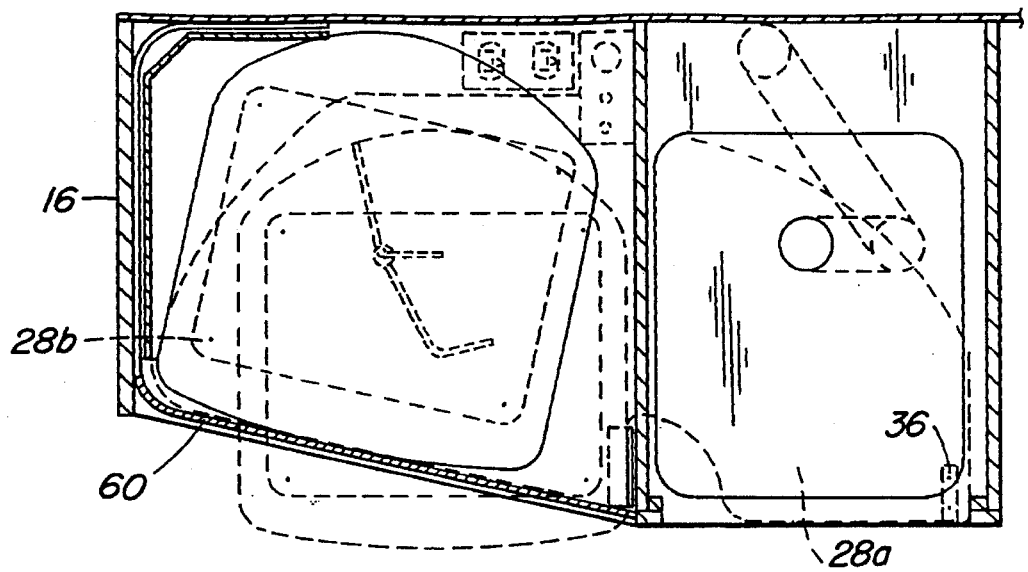
FIG. 2 is a top plan view of the kitchen cabinet counter (with the top of the counter having been removed) showing the rotatable shelf and television in the retracted condition.
Figure 3:
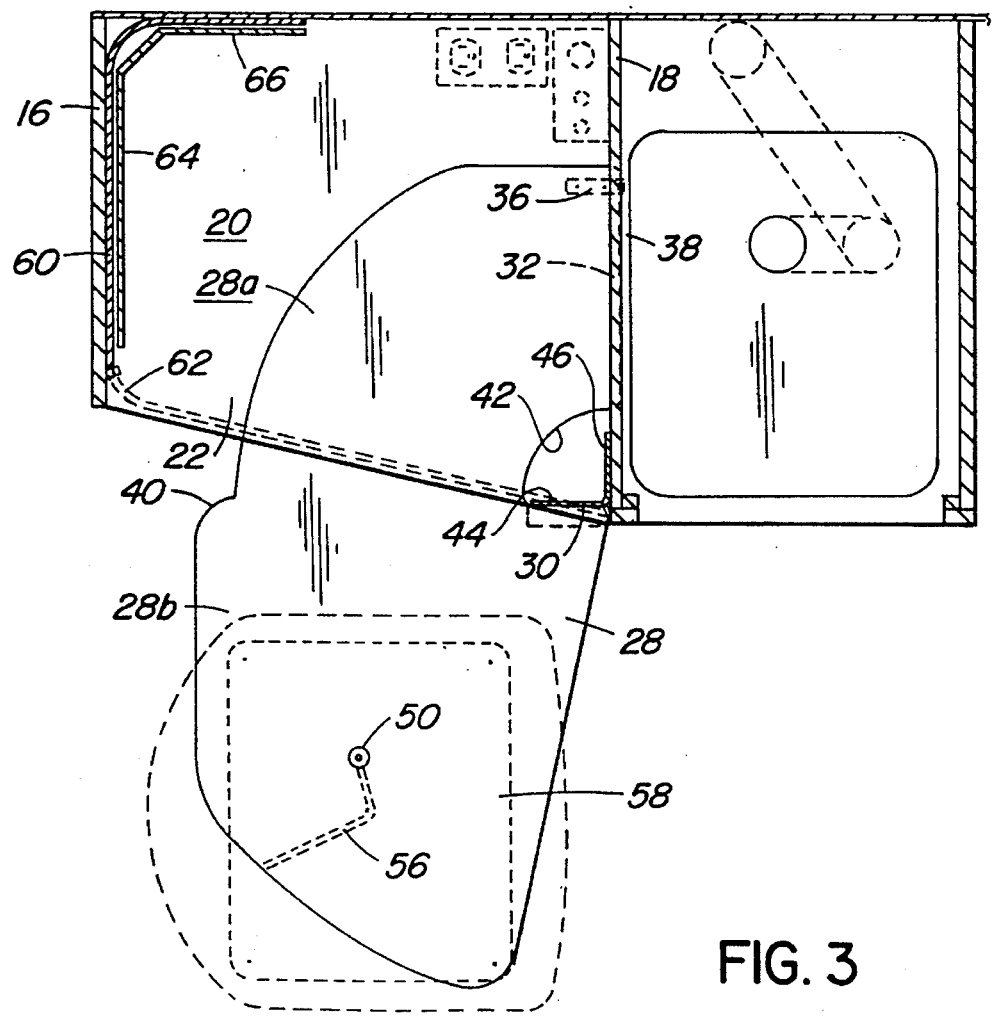
FIG. 3 is a view similar to FIG. 2 but with the shelf in the extended condition and the television set and base plate being shown in phantom.

As best seen in FIG. 3, the rotatable shelf 28 is shaped such that when it is rotated to a first extended position, a substantial portion 28b thereof extends outwardly of compartment 20 by way of the door opening 22 to provide support for the TV set thereon (shown in dashed lines in FIG. 3). At the same time the remaining portion 28a of the rotating shelf overlies the lower shelf 24 and extends through the slot 32 in vertical partition 18 so that the partition 18 and/or the previously noted upper and lower shelves 24, 26 can counteract the vertical loadings applied to the outwardly extending cantilevered portion 28b of rotatable shelf 28. It will also be readily seen, particularly from FIGS. 2 and 3, that the rotatable shelf 28 is shaped and contoured such that it may be rotated into a retracted position (shown in dashed lines in FIG. 2) wherein the shelf is disposed entirely within the cabinet 12 together with the TV set supported thereon with the rotatable shelf 28 extending via the slot 32 from compartment 20 into the other compartment 22. Because of the close proximity of lower and upper shelves 24 and 26 to the rotatable shelf 28 as well as the upper edge of slot 32, the rotatable shelf 28 is maintained in a stable horizontal position even when in the extended mode illustrated in FIG. 3 with little or no stress being applied to the hinge 30.

The rotatable shelf 28 is capable of rotating through an angle of about 90°. The outward extent of its angular travel is established by a hook bracket 36 fastened to the bottom of the rotatable shelf at the trailing edge 38 thereof. This hook bracket 36 bumps against the vertical partition 18 adjacent the rearward end of the slot 32 in partition 18 when the rotatable shelf has been moved to its fully extended position as illustrated in FIG. 3. Likewise, in order to define the innermost retracted position of the rotatable shelf 28, there is provided a midway corner 40 on the rotatable shelf 28 (see FIG. 3) which serves as a stop against vertical partition 18 adjacent the rearward end of the slot 32 when the rotatable shelf 28 is in the fully retracted position (see FIG. 2).

The previously noted slot 32 is just long enough to accommodate the portion 28a of shelf 28 which extends through it. This portion 28a is accordingly of a somewhat quarter-round shape and as the shelf 28 is rotated, this portion 28a slides back and forth through the slot 32 while at the same time sliding under the upper shelf 26 and over the lower shelf 24 with, as noted previously, both of these shelves together with the slot providing stability to the shelf 28 and counteracting loadings applied thereto particularly when extended while at the same time avoiding any overstressing of the hinge 30.

As best seen in FIG. 3, a quarter-round section 42 of the shelf 28 is cut out adjacent the hinge 30. This particular shaping allows the inner portion 28a of the shelf to enter the slot 32, which slot 32 commences a selected distance inwardly from the front edge of the vertical partition 18. Additionally, this cut-out portion 42 allows one blade 44 of the hinge 30 to be fastened to the rotating shelf 28 while the other blade 46 is secured to that portion of vertical partition 18 which extends between the front end of slot 32 and the front vertical edge of partition 18.

The outer portion 28b of rotatable shelf 28 is provided with a hole 50 which receives a bolt 52. This bolt 52 protrudes through a generally L-shaped slot 56 which is provided in a rectangular base plate 58 to which the television is fastened. The slot 56 and bolt 52, when suitably loosened, allow the television to be pivoted and/or to be slid back and forth when the shelf 28 is in the extended mode thereby to position the television set for convenient viewing. This slot and bolt arrangement along with the cabinet sliding door 60 to be described hereinafter keeps the television and rotatable shelf 28 when retracted in a safe and secure position particularly during driving of the vehicle. When the cabinet door 60 is opened the television can also be watched while in the retracted position. It might also be noted that when in the retracted position there are no exposed wire connections hanging from the television set but, rather, the wires are all hidden inside the cabinet.

Reference was made above to the sliding door 60 for closure of the frontal door opening 22. The preferred type of sliding door is a flexible door known by the tradename "Tambour". Typically such doors are made from ½ inch wide by ⅛ inch thick plywood strips glued to a flexible backing material. The upper and lower edges of the door are contained within suitably sized upper and lower grooves 62 which extend along the upper and lower margins of the door opening 21 and thence inside and along the cabinet side wall 16 and part way along the rear of the cabinet. Additional thin panel members 64 and 66 which are disposed in spaced parallel relation to the side and rear walls of the cabinet provide a pocket or receptacle for receiving the flexible Tamhour door 60 therein when in the retracted position as best seen in FIG. 3. It can readily be seen that when door 60 is in the closed position, as illustrated in FIG. 2, that the rotatable shelf 28, together with the TV set mounted thereon, are maintained in a safe and secure position within compartment 20 of the cabinet, this being especially important when the vehicle is being driven.

A preferred embodiment of the invention has been described by way of example. Those skilled in the art will realize that various modifications and changes may be made while remaining within the spirit and scope of the invention.

Hence the invention is not to be limited to the embodiment as described but, rather, the invention encompasses the full range of equivalencies as defined by the appended claims.

I claim:

1. A viewing and storage system for a television set including a cabinet having a pair of adjacent compartments; one said compartment being sized to receive the television set and having a frontal door opening therein, said one compartment also having a fixed horizontal lower shelf therein and a rotating horizontal support shelf rotatable about a vertical axis, said rotatable shelf being located at a level above said lower shelf and in close juxtaposition thereto; said rotatable shelf being shaped such that when rotated to a first extended position, a substantial portion of said shelf extends outwardly of said one compartment via said door opening for support of the television set thereon with a remaining portion of the rotatable shelf overlying said lower shelf, means for counteracting vertical loadings applied to the outwardly extending portion of said rotatable shelf, and said rotatable shelf also being shaped such that when rotated to a second retracted position said rotatable shelf is disposed substantially entirely within said cabinet and extends from said one compartment into the other compartment.

2. The viewing and storage system of claim 1 further including a base plate mounted to said portion of the rotatable shelf which is capable of extending outwardly of said one compartment, said base plate being mounted to permit both rotational and translational motion thereof relative to the rotatable shelf whereby to allow the television set mounted thereon to be adjusted to a variety of viewing positions.

3. The viewing and storage system of claim 2 further including stops associated with said rotatable shelf to define both said extended and retracted positions.

4. The viewing and storage system of claim 2 wherein said pair of compartments are separated by a vertical partition having a slot therein through which part of said rotatable shelf extends in close proximity thereto.

5. The viewing and storage system of claim 2 wherein said pair of compartments are separated by a vertical partition having a slot therein through which part of said rotatable shelf extends in close proximity thereto and the other compartment having a horizontal upper shelf therein with said rotatable shelf being located at a level intermediate said upper and lower shelves and in close juxtaposition thereto to enable said partition and/or said upper shelf to provide said means for counteracting said vertical loadings.

6. A viewing and storage system for a television including a cabinet having a pair of adjacent compartments separated by a vertical partition; one said compartment being sized to receive the television set and having a frontal door opening therein; said one compartment having a horizontal lower shelf therein and the other compartment having a horizontal upper shelf therein, and a rotating horizontal support shelf rotatable about a vertical axis, said rotatable shelf extending through a slot in said vertical partition and being located at a level intermediate said upper and lower shelves and in close juxtaposition thereto; said rotatable shelf being shaped such that when rotated to a first extended position, a substantial portion of said shelf extends outwardly of said one compartment via said door opening for support of the television set thereon with the remaining portion of the rotatable shelf overlying said lower shelf and extending through said slot in said partition so that said partition and/or said upper shelf counteracts vertical loadings applied to the outwardly extending portion of said rotatable shelf, and said rotatable shelf also being shaped such that when rotated to a second retracted position said shelf is disposed substantially entirely within said cabinet and extends via said slot from said one compartment into the other compartment.

7. The viewing and storage system of claim 6 further including a base plate secured to said portion of the rotatable shelf which is capable of extending outwardly of said one compartment, said base plate having a generally L-shaped slot therein allowing both rotational and translational motion thereof relative to the rotatable shelf whereby to allow the television set mounted thereon to be adjusted to a variety of viewing positions.

8. The viewing and storage system of claim 7 further including stops associated with said rotatable shelf to define both said extended and retracted positions.

9. The viewing and storage system of claim 6 wherein said vertical axis is defined by a fixed pivot means disposed adjacent both said vertical partition and a frontal portion of said one compartment.

10. The viewing and storage system of claim 9 wherein said pivot means comprises a leaf hinge having a leaf thereof fixed to said rotatable shelf and another leaf secured to the vertical partition, and a cut-out portion in said rotatable shelf to accommodate said hinge.

11. The viewing and storage system of claim 1 including a sliding door for closure of the frontal door opening and for retaining the rotatable shelf in the second retracted position when in the closed position.

12. The viewing and storage system of claim 6 including a sliding door for closure of the frontal door opening and for retaining the rotatable shelf in the second retracted position when in the closed position.

* * * * *